United States Patent [19]
Fleckenstein

[11] 3,768,649
[45] Oct. 30, 1973

[54] REGENERATION SENSING SYSTEM

[76] Inventor: Andrew J. Fleckenstein, 2880 Santa Marin Dr., Brookfield, Wis. 53005

[22] Filed: July 15, 1971

[21] Appl. No.: 162,804

Related U.S. Application Data

[63] Continuation-in-part of Ser. No. 856,655, Sept. 10, 1969, abandoned.

[52] U.S. Cl. ................................ 210/96, 210/140
[51] Int. Cl. ............................................ B01d 15/06
[58] Field of Search .................... 210/25, 96, 140, 210/85

[56] References Cited
UNITED STATES PATENTS 3,176,844  4/1963  Nelson ................................ 210/96
3,574,330  4/1971  Prosser ............................... 210/96

Primary Examiner—John Adee
Attorney—Robert C. Brown, Jr. et al.

[57] ABSTRACT

An electrical system for sensing the desirability of regeneration of a water softener tank. A first probe measures the resistance of water flowing through the softener bed and this resistance is compared through an electrical network with a standard provided by the resistance of an auxiliary bed. A comparison circuit actuates a regeneration circuit when the resistance measured by the first probe is at a predetermined relationship to the resistance of the standard.

10 Claims, 7 Drawing Figures

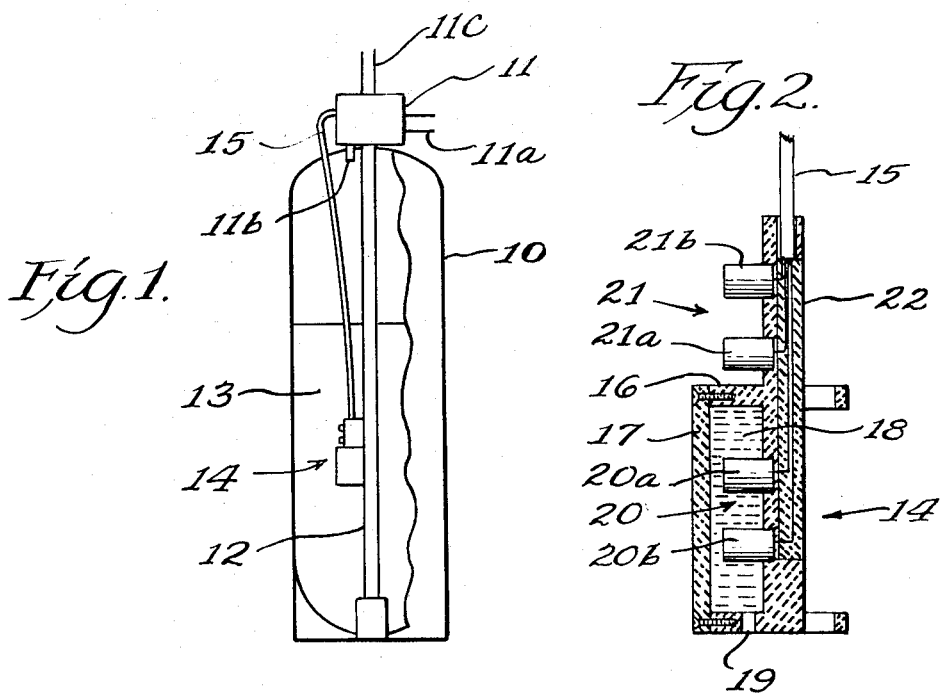
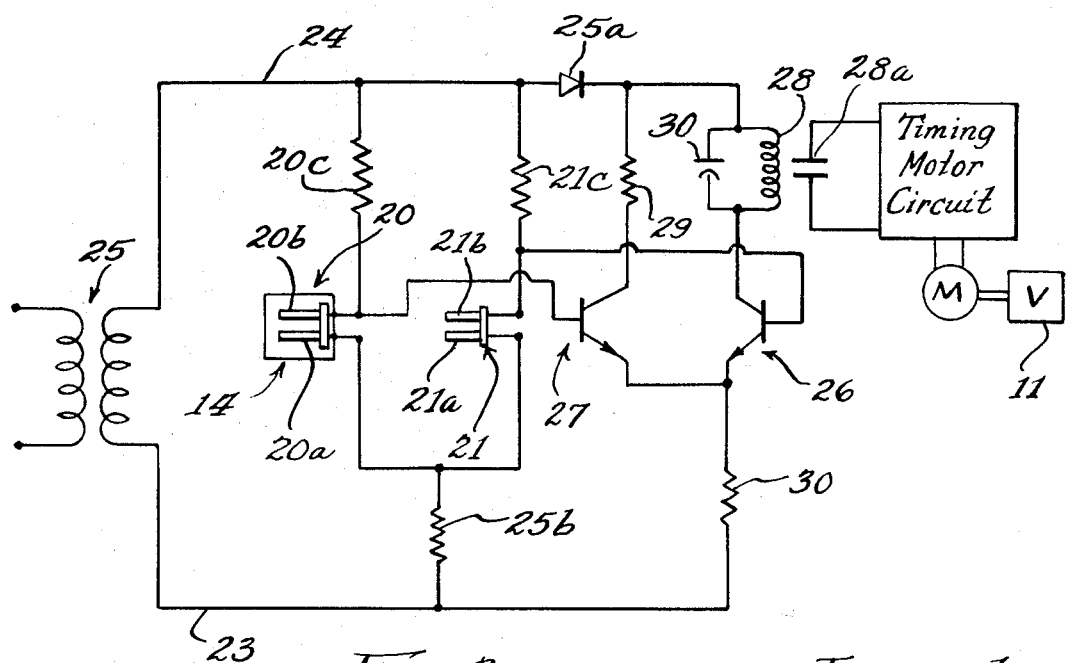

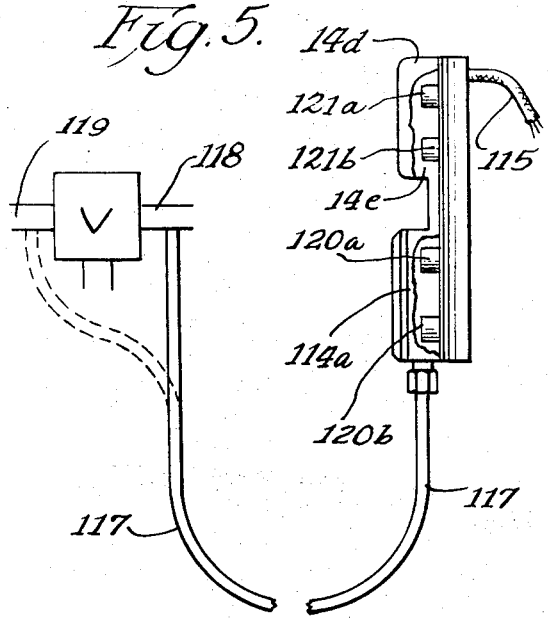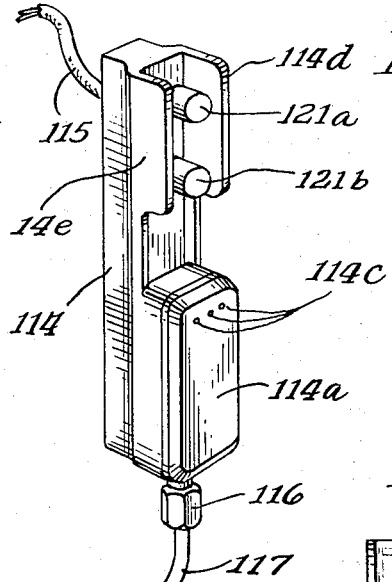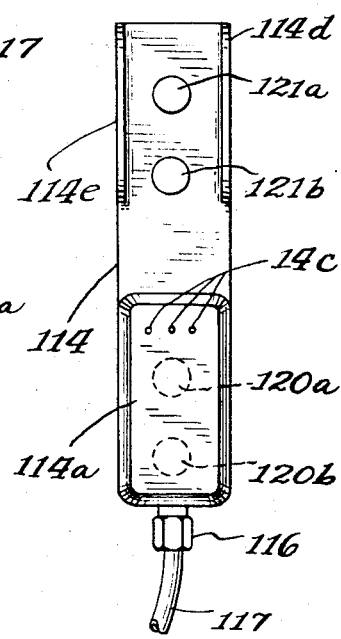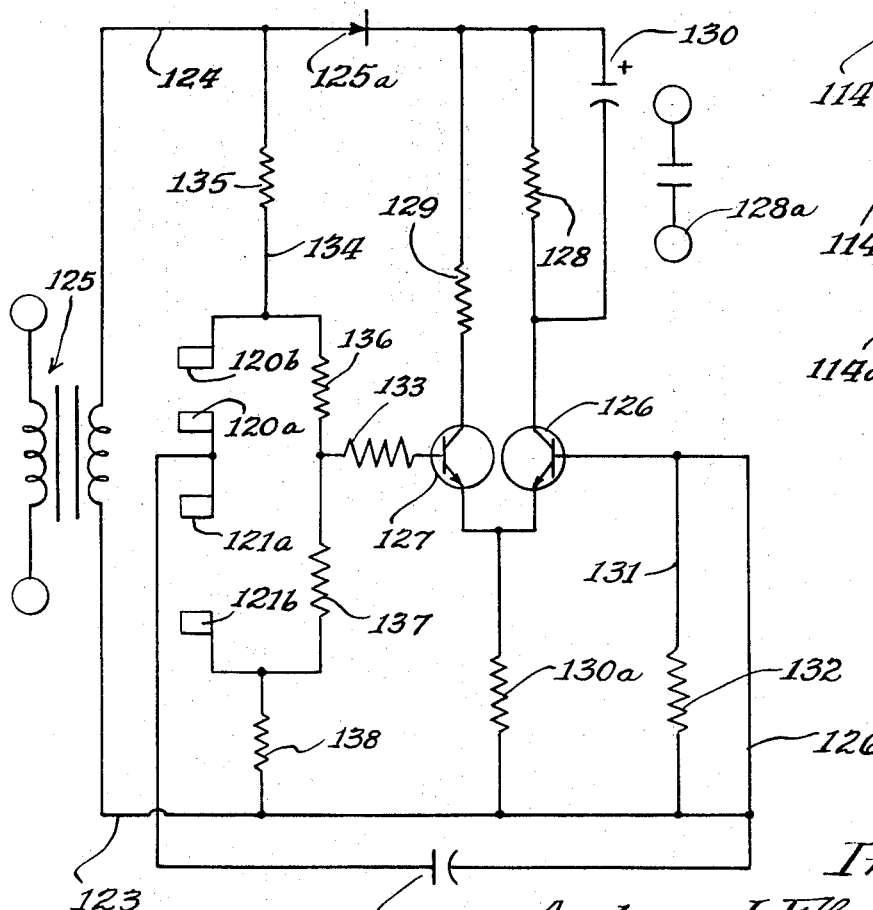

REGENERATION SENSING SYSTEM

This application is a continuation-in-part of my previous application Ser. No. 856655, filed Sept. 10, 1969 and now abandoned.

The present invention is directed to new and useful improvements in controls for sensing the need for regeneration of water softeners.

In a conventional water softening apparatus the hard water supply line is connected to a tank containing water softening material and the water passing through this tank is softened and supplied through a service outlet. After a predetermined amount of hard water has passed through the bed, the ion exchange capability of the bed becomes depleted. Regenerating materials are then used to reactivate the bed. Brine is commonly used to reactivate the bed. Oftentimes a time controlled valve is employed with such apparatus so as to periodically regenerate the bed of softening material by passage of a brine solution through the material. Such time control systems necessarily regenerate the bed even though the softening bed does not need regeneration. This wastes brine and water, and causes unnecessary wear of the automatic motor, valve and regenerating system.

For a number of years it has been known that the need for regeneration could be sensed either electrically or physically so as to automatically activate a regeneration circuit only when regeneration was necessary. For example, McCanna U.S. Pat. No. 1,928,384 uses a pair of probes to sense conductivity or resistance and automatically activate a regeneration circuit. Sard patent 2,628,191 of Feb. 10, 1953, utilizes a bridge circuit for comparing the difference in resistance between softened water and a portion of the softened water which is passed through an auxiliary softening bed to cause regeneration of the softening tank when needed.

The major purposes of the present invention are to provide an improved electrical system which senses the need for regeneration by comparing resistance across electrodes in a bed of water softening material in a water softening tank with the resistance across electrodes in an auxiliary bed of mineral of the same type as that in the water softener bed, and to so arrange the system that it is substantially independent of temperature changes and independent of conductivity changes in the hard water supply line from time to time, and to so arrange such a system that regeneration is accomplished only when necessary and at a particular time of day. The auxiliary bed of mineral may be supplied with either hard or soft water in the present invention.

These and other purposes of the invention will become more apparent in the course of the ensuing specification and claims when taken with the accompanying drawings, in which:

FIG. 1 is a diagrammatic view of a typical water softening system utilizing the present invention;

FIG. 2 is a sectional view of sensing probes utilized in the system;

FIG. 3 is a diagram of an electrical circuit utilized in the present invention;

FIG. 4 is a perpsective view of a modified probe assembly;

FIG. 5 is a diagrammatic side view of the probe assembly illustrated in FIG. 4 and illustrating a connection to a water softener valve;

FIG. 6 is a front view of the probe assembly illustrated in FIG. 4; and

FIG. 7 is a diagrammatic view of a modified circuit which may be utilized in the invention.

Like elements are designated by like characters throughout the specification and drawings.

With specific reference now to the drawings and in the first instance to FIG. 1, the numeral 10 designates a water softening tank having a control valve 11 mounted on top of a tank. The control valve has a hard water inlet 11a which supplies hard water to the upper portion of the tank through a pipe 11b. The valve is shown with a service outlet for the flow of soft water through a pipe 11c. An elongated pipe or conduit 12 extends downwardly from the valve 11 so as to withdraw softened water from the tank and upwardly therethrough and to the service outlet 11c. A bed of water softening material 13 is disposed within the tank in a manner known to the art.

Time control mechanisms as known to the art may be used to periodically actuate valve 11 for back flow and brine and rinse operations as known to the art. The showing of the tank and valve system in FIG. 1 should be taken as generally representative of water softening systems known to the art.

In accordance with the invention, a sensing probe assembly, generally designated at 14, is mounted within the bed of softening material. The assembly 14 includes an electrical conduit 15 leading to a control circuit for the valve 11.

The sensing assembly 14 is conveniently formed as a small box 16 having a cover 17. The box and cover are formed from an insulating material. A bed of water softening material 18 of the same type as that employed in the bed 13 is disposed within the box or chamber 16. The box includes a vent 19 which allows water of the same temperature and of the same relative conductivity as that in the tank to enter the box. The bed of mineral in the box is fully depleted and corresponds generally to the condition of the mineral in tank 10 when regeneration is needed. The water and mineral mass within the box thus provides a conductivity standard or reference. A standard probe assembly 20, defined by a pair of spaced generally parallel metal rods or electrodes 20a and 20b, are fixed within the box. The electrodes may be made of carbon. The electrodes 20a and 20b are connected to an electrical circuit as illustrated in FIG. 3 for purposes of introducing the resistance between the two electrodes 20a and 20b in the circuit of FIG. 3. The exterior of the box carries a measuring probe 21 defined by a pair of electrodes 21a and 21b which are of the same material as the electrodes 20 a and 20b and of the same dimensions. Electrodes 21a and 21b are spaced similarly to the spacing of electrodes 20a and 20b. The electrodes 21a and 21b may be mounted on an exterior extension 22 of the box. They may be mounted at other locations on the box. The electrodes 21a and 21b are adapted to introduce the resistance therebetween as provided by the water and mineral mass between these probes in the electrical circuit of FIG. 3, for comparison with the standard or reference resistance provided by the probe 20.

The two electrodes 21a and 21b of the measuring probe are in a line across the two main lines 23 and 24 of a power circuit. The power circuit is energized from a step-down transformer 25 so as to provide a suitable low voltage in the control circuit.

The two electrodes 20a and 20b are also in a line across the power lines 23 and 24. The resistance of the electrodes 20a, 20b, and 21a, 21b are connected in series with resistors 20c and 21c, respectively, and to common resistor 25b. The voltage divider action of this group of resistors causes an AC signal to be impressed across the electrodes of each probe 20 and 21. A blocking diode 25a is also in the circuit so as to transform the AC signal into a pulsating DC signal. This pulsating DC signal is applied to a differential amplifier circuit. The differential amplifier includes two transistors 26 and 27. One transistor, for example transistor 26, has its base energized from the circuit line leading to the measuring electrodes 21a and 21b. The other transistor 27 has its base energized from a line connected to the line having the standard electrodes 20a and 20b. The transistor 26 has its emitter and collector in series with a relay coil 28. The emitter of transistor 27 is connected in common with the emitter of transistor 26. Resistor 29 limits the collector current of transistor 27 to a safe value.

A capacitor 30 is in parallel with the relay coil 28 and acts as a filter to avoid chattering of the relay. When the resistance between the two electrodes of the measuring probe 21 increases to a predetermined extent, as when regeneration is necessary, it will cause a greater current to pass to the base of the transistor 26 and thus allow current flow through the relay coil. As long as the current flow to the base of the transistor 27 is equal to or greater than the current flow to the transistor 26, the transistor 27 will conduct and simply bypass the transistor 26, and the relay coil 28 will remain unenergized.

Resistances 30, 25b, 20c and 21c limit the voltage across the probes to minimize electrolysis of the water. The values of the resistance may be selected to provide conduction of transistor 26 at a selected value of increased resistance of probe 21.

When the transistor 26 conducts, as for example when the resistance across the measuring probe increases to a predetermined amount, it will energize relay 28 and close the normally open switch 28a. The normally open switch 28a is simply a circuit enabling switch in the timing circuit of the regenerating circuit. When this switch is open, the remainder of the timing circuit cannot be energized regardless of other conditions. Thus the water softening cycling apparatus may be set to regenerate at 3 o'clock in the morning of each day. If regeneration is not needed, as measured by the measuring probe, the switch 28a remains open and the regeneration cycle is not started. It is only when the measuring probe passes current to the relay coil that the regeneration timing circuit may be energized at the selected time of day so that the water softening bed is actually regenerated.

The timing motor circuit for the valve 11 is of a known form and may include timing mechanism adapted to energize the circuit to the motor M of valve 11 at a preselected time of day. Once the circuit is energized, some holding means such as a cam operated switch or holding relay maintains the energization of the motor circuit so as to slowly shift the valve through a complete regeneration cycle. As an alternative, the time control circuit may energize the motor M periodically so as to shift the valve to the various positions corresponding to backwash, brine and rinse and final service positions. In this latter event, the time control mechanism conditions the motor circuit for operation at a selected time of day. Timing motor circuits for water softening valves as thus described are known to the art and the showing in FIG. 3 of circuits of this type is, therefore, diagrammatic.

Switch 28a is in the motor control circuit so that, when open, the motor circuit is deenergized regardless of the time of day. When switch 28a closes and is closed at the time of day set for regneration, the motor circuit will be energized or conditioned for the regeneration cycle and a suitable holding means will maintain energization of the circuit as required until the regeneration cycle is completed.

The standard sensing box or chamber 14 may be positioned at any place in the bed of water softening material in tank 10. It is generally considered preferable to locate it substantially midway of the height of the bed of material or at lower positions. The water and mineral mass within the box or chamber 14 provides a standard resistance which is greater than the resistance measured by probe 21 when the mineral bed in tank 21 does not need regeneration. The reference probe and standard probe are located alongside one another so that the temperature of the water between the electrodes of each probe is essentially the same. The water in the box 16 is essentially stationary with some minor flow in and out through the vent 19. The condition of the water in the box 16 (either soft or hard) does not affect the control because the resistance measured is dependent upon the mineral condition to a greater extent than the water.

As an alternative to the use of the single vent 19, both upper and lower vents may be formed in the chamber so that water within the tank may actually flow through the chamber 14 but at a slower flow rate than the normal flow rate through the tank proper. The use of an AC signal across the probes is believed to be superior to the use of a DC signal across the probes.

In lieu of using a depleted bed of mineral 18 in the standard box 16, the same basic arrangement disclosed herein may be used with a properly regenerated bed of material in the box 16. In that event, different values of resistance must be used in the circuit illustrated in FIG. 3 so that transistor 26 conducts at a predetermined level of increase in resistance measured by probe 21 as compared to the resistance measured by the standard probe 20. If the standard resistance is provided by a properly regenerated bed of material in the box 16, this bed is gradually depleted, although at a much slower rate than depletion of the main bed 13 in tank 10. Hence, the material in the box 16 must either be replaced or regenerated periodically. For this reason it is preferred to use an exhausted or depleted bed of mineral in box 16 to provide the reference resistance as herein described.

FIGS. 4, 5 and 6 illustrate a modified probe assembly. In these figures a probe support is defined by a molded plastic body generally designated at 114. An electrical conduit 115 leads through the body for connection to a pair of electrodes 120a and 120b defining a reference or standard probe and to a pair of electrodes 121a and 121b defining a measuring probe. The electrodes 120a, 120b, 121a and 121b are formed in the manner described for the electrodes 20a, 20b, 21a and 21b. The body 114 is formed to define a compartment 114a around the electrodes 120a and 120b. The front of this compartment is closed by a cover 114b which is fitted over the side walls defining the compartment while sealing the compartment from the exterior. This compartment 114a is filled with a depleted bed of water softening mineral or resin of the same type utilized in the water softening tank 10.

A water inlet to the compartment 114a is defined by a fitting 116 to which a conduit 117 is fixed. Conduit 117 connects with either the hard water inlet 118 of a water softening valve V or to a source of soft water 119 as indicated by the dotted line leading to the soft water outlet from the valve. A series of small pin hole vents 114c are formed in the cover 114b so that water entering the inlet may seep through the bed of depleted minerals in the compartment and out through the vents 114c.

This construction minimizes the possibility of brine entering the compartment 114a during a regeneration cycle because the compartment 114a is under a pressurized condition from either the line 118 or 119. It makes little difference whether the water supplied to the bed in the compartment 114a is soft water or hard water because the resistance across the electrodes 120a and 120b is dependent for the most part upon the depleted bed of mineral mass which surrounds the electrodes. Any actual difference in conductivity between soft water or hard water has little effect upon the resistance actually measured in the present system. This is true in the system of FIGS. 1–3 as well as in FIGS. 4–7.

It is preferred to form the body 114 with spaced flanges 114d and 114e on opposite sides of the electrodes 121a and 121b. Thus, when the probe assembly is inserted in the bed of mineral mass in the water softening tank 10, the flanges 114d and 114e help to make the resistance across the electrodes 121a and 121b closer to the range of resistance across 120a and 120b. The flanges are of highly resistive material and interrupt part of the field of conduction paths between electrodes 121a and 121b in the softener resin bed.

FIG. 7 illustrates a circuit similar to the circuit of FIG. 3 for energizing a relay to a timing motor circuit when the resistance sensed by the measuring electrodes 121a and 121b indicates the need for regeneration. In FIG. 7, power lines 123 and 124 are adapted to be energized from a low voltage AC source indicated by transformer 125 in a manner similar to the circuit of FIG. 3. Transistor 126 has its base energized by a voltage which depends upon the resistance across the measuring electrodes 121a and 121b, and reference probes 120a and 120b. As long as the resistance across the electrodes 120a, 120b is such, with relation to the resistance across electrodes 121a and 121b, to cause a smaller energizing voltage to the base of transistor 126 than the voltage to the base of transistor 127, transistor 127 conducts and simply bypasses or shunts the transistor 126. However, when the resistance across electrodes 121a and 121b rises becuase of depletion of the mineral bed and becomes great enough to cause an energizing voltage to the base of transistor 126 equal to or greater than the voltage to transistor 127, transistor 126 then conducts to thereby energize the relay coil 128 which is in series with the collector of transistor 126. In FIG. 7 a diode 125a is in the line 124. A resistance 129 is in a line leading from line 124 to the collector of transistor 127. A capacitor 130 is in parallel with relay coil 128 to minimize chattering of the relay. A resistance 130a is connected between power line 123 and the emitters of transistors 126 and 127.

In FIG. 7 the base of transistor 126 is connected to a line 126a between the probes 120a and 121a. An additional line 131 is connected to the base circuit and to the line 123 through a resistor 132. The base of transistor 127 is connected through a resistor 133 to the junction between resistors 136 and 137. Line 134 contains resistances 135, 136, 137 and 138. Resistors 136 and 137 provide a voltage divider. Line 134 has a branch connection to each measuring probe 121b and 120b. The resistances 135 and 138 as well as the resistances 136 and 137 limit the voltage across the probes to minimize electrolysis of the water. A capacitor 139 is in line 126a to minimize D.C. components in the line.

In a typical circuit, resistances 135, 136, 137 and 138 may have values of approximately 470 ohms, 100 ohms, 51 ohms and 22 ohms, respectively. Resistances 129, 130a, 132 and 133 may have values of approximately 470 ohms, 39 ohms, 10,000 ohms and 1,000 ohms, respectively. Capacitors 130 and 139 may have values of approximately 100 microfarads and 10 microfarads, respectively.

All of the systems disclosed herein may be connected to the timing circuit for a water softening valve in a manner such that the comparing circuit is only energized at a preselected time of day. This may be done by inserting a relay in the power lines 123 and 124 which closes only when the timing mechanism is energized at a preselected time of day as, for example, 3 o'clock in the morning of each day. The operating circuit for the valve operating motor will nonetheless remain deenergized until closure of the switch under influence of the relays 28 or 128 indicating that regeneration is needed.

On the other hand, the power to the comparing circuit may be left on throughout the day, if desired, in which case regeneration will still only be accomplished at the time of day selected for regeneration. In this event, the timing circuit for the valve operating motor will close the circuit to the operating motor only upon closure of the switch 28a or 128a and an additional switch in series with the coil 28 or 128 and actuated by the timing mechanism to close at a preselected time of day.

Another operation made possible with the present circuit has the power to the circuit on continuously and uses the relay switch 128a or 28a to energize a timer which begins the regeneration immediately. Thus the regeneration begins at the same time the resin in the softener bed is depleted at 121a and 121b. This is commonly termed a "demand system."

In all embodiments of the invention the temperatures of the water and bed ajdacent the measuring electrodes is substantially the same as that in the auxiliary bed for the reason that the auxiliary bed is surrounded by the water within the tank. The conductivity of the water around the measuring electrodes is essentially the same as the conductivity of the water within the auxiliary bed. This is true because in FIGS. 1–3 the water within the tank is supplied to the auxiliary bed. In FIGS. 4–7 the water supplied to the auxiliary bed comes from either the hard water supply line or the soft water service line. This helps keep the standard (auxiliary bed) at the same temperature as the softener bed. The conductivity of water in the soft water outlet line may be somewhat different from that of the hard water supply line but, as stated in the foregoing, this is relatively immaterial to the system. The important thing is that the conductivity of the water supply to the tank is essentially the same for measuring purposes as the soft water which flows from the tank. If conductivity of the hard water supply changes significantly over a period of several weeks, this change will also be reflected in the conductivity of the soft water flowing from the tank and the conductivity in the standard bed between electrodes 120a and 120b.

I claim:

1. A system for sensing the need for regeneration of water softening material in a water softening tank including a first resistance measuring probe positioned in the flow path of softened water in said softening tank having water softening material therein and a second standard resistance measuring probe of the same type as the first probe, said second probe being positioned within a substantially closed chamber in said tank, said chamber containing water softening material of the same type as that within the water softening tank but in a depleted condition, said chamber including means for admitting a predetermined quantity of water therein so as to provide a resistance for said standard probe as a defined resistance corresponding to the resistance of a depleted bed of water softening material, and means for comparing the resistance measured by said two probes and indicating a predetermined increase of resistance by said measuring probe.

2. The system of claim 1 wherein said last named means is defined by a differential amplifier circuit for comparing said resistances and for energizing a relay coil when the magnitude of the resistance measured by said measuring probe bears a predetermined relationship to the resistance measured by said standard probe.

3. The system of claim 2 wherein said differential amplifier is defined by a pair of transistors having collectors and emitters in parallel circuits, one of said transistors being in series with said relay coil and the other of said transistors being connected to shunt the other transistor, said one transistor having its base energized and controlled by current regulated by said measuring probe and the other transistor having its base energized and controlled by current regulated by the resistance of said standard probe, said one transistor being formed and adapted to pass an energizing current to said relay coil when said resistance of said measuring probe reaches said predetermined amount, said other transistor being formed and adapted to shunt said one transistor at lesser amounts of resistance.

4. A system as set forth in claim 1 wherein said means for admitting a predetermined quantity of water includes an inlet to said chamber formed and adapted for communication with the water within said tank.

5. A system as set forth in claim 1 wherein said means for admitting a predetermined quantity of water includes a fitting communicating with said chamber and communicating with a water supply line outside of said tank, said chamber including bleed apertures in the upper portion thereof so as to maintain the chamber under pressure from the water supply source exterior of the tank while preventing inflow of water from said tank to said chamber.

6. A system as set forth in claim 5 wherein said water supply is connected to a line carrying soft water from the tank.

7. The system of claim 5 wherein said water supply is connected to a line carrying hard water from the tank.

8. A system for sensing the need for regeneration of water softening material in a water softening tank including a first resistance measuring probe adapted to be positioned in the flow of water in a softening tank and a second standard resistance measuring probe of the same type as the first probe, said second probe being positioned within a substantially closed chamber in said tank, said chamber containing water softening material of the same type as that within the water softening tank, said chamber including means for admitting a predetermined quantity of water therein so as to provide a resistance for said standard probe as a defined resistance, and means for comparing the resistances measured by said two probes and indicating a predetermined increase of resistance by said measuring probe.

9. The system of claim 8 wherein said probes are carried on a plastic support and said support includes portions defining said chamber, said first probe being positioned inbetween spaced flanges of said support.

10. The system of claim 9 wherein said chamber defining portions include a small aperture for bleeding water admitted to said chamber therefrom to thereby maintain said chamber under pressure.

* * * * *